Sept. 12, 1939.  P. WANGEMANN  2,172,423
ELECTRIC CIRCUIT BREAKER
Filed Dec. 27, 1937    2 Sheets-Sheet 1

INVENTOR.
Paul Wangemann
BY
ATTORNEY.

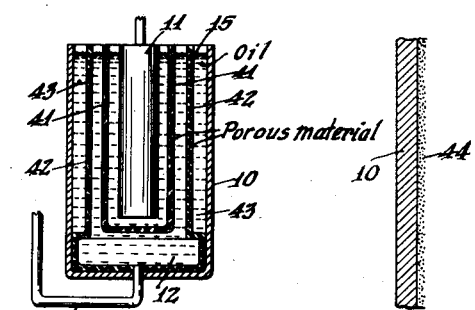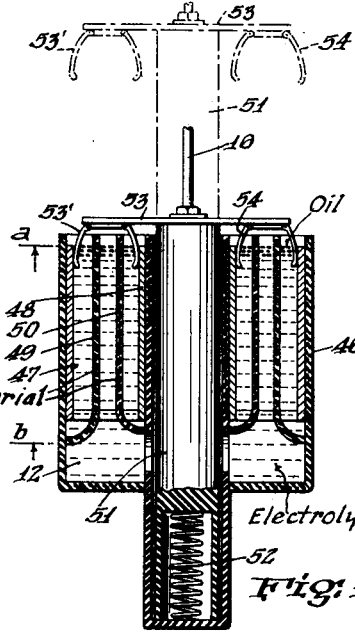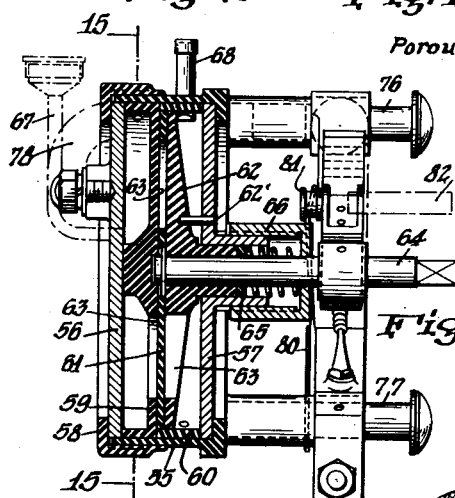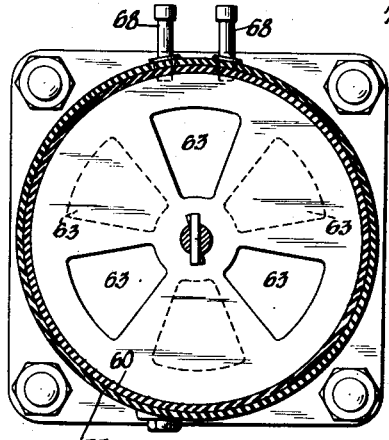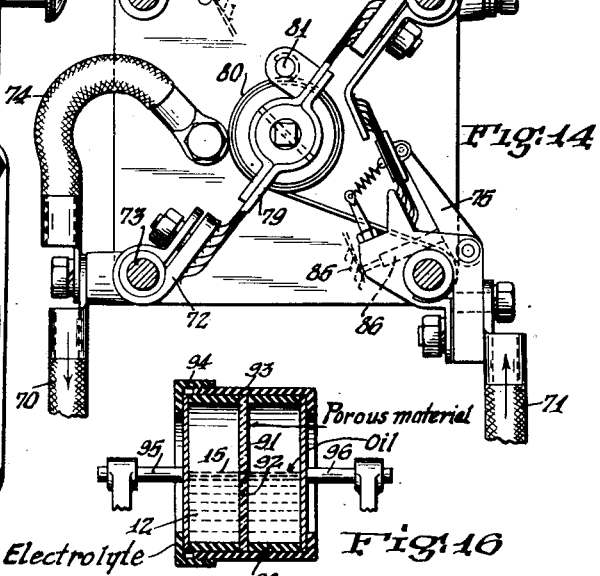

Patented Sept. 12, 1939

2,172,423

UNITED STATES PATENT OFFICE 2,172,423

ELECTRIC CIRCUIT BREAKER

Paul Wangemann, New York, N. Y.

Application December 27, 1937, Serial No. 181,837
In Germany December 28, 1936

10 Claims. (Cl. 200—152)

The present invention relates to electric circuit breakers or switches, more particularly to electrolytic circuit breakers, and among the objects of the invention is the provision of an improved construction for the sparkless making and breaking of very high currents in electrical circuits.

A more specific object of the invention is the provision of an improved electrolytic circuit breaker construction wherein the electrodes connected through an electrolyte or conductor of the second class remain in contact with the electrolyte after the electrolyte path has been broken during the open position of the circuit. In this manner a current interruption between the electrolyte-to-metal contact and consequent sparking or arcing due to the formation of metal vapors and other obvious defects are avoided.

Another object is to provide a circuit breaker construction of the above character utilizing an electrolyte or conductor of the second class as a circuit path and a metallic shunt circuit connected in parallel thereto, whereby in the normal or closed position of the circuit breaker the current passes through said shunt circuit and whereby during interruption or opening of the circuit first said metallic shunt circuit is opened and thereafter the electrolyte path interrupted, and vice versa during the closing of the circuit.

Another object is the provision of means in connection with a combined electrolytic and metallic circuit breaker of the aforementioned type, the latter arranged in shunt relation to the former, wherein during the opening of the circuit first the metallic contact is broken and thereafter the electrolyte path interrupted, whereupon both the electrolyte and metallic path are disconnected from the potential of the associate circuit, all these operations being performed by a single operating movement.

Another object is the provision of an electrolytic circuit breaker wherein open air spaces are substantially avoided, thereby preventing the formation of parallel spark gaps by ionization of the air and the defects accompanied thereby.

The above and further objects and advantages of the invention will become more apparent from the following detailed description taken with reference to the accompanying drawings forming part of this specification and wherein—

Figure 1:
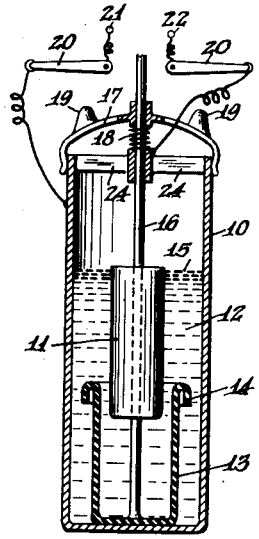
Figure 2:
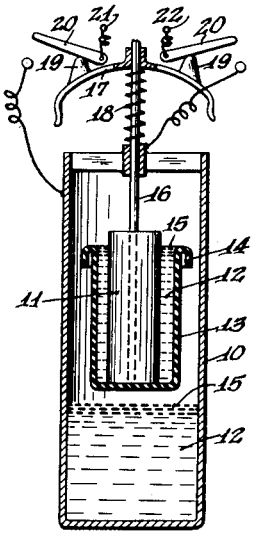
Figure 3:
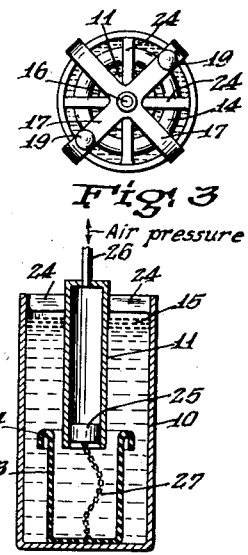
Figure 6:
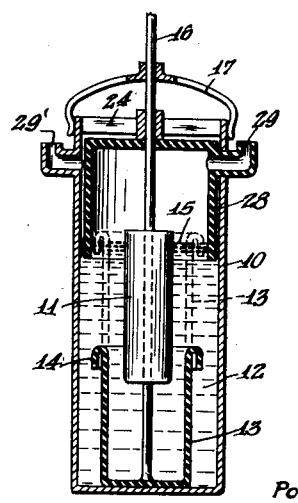
Figure 7:
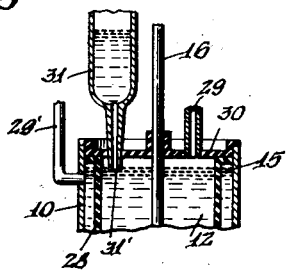

Figure 1 is a cross-sectional view of a simple circuit breaker in the closed position with the improvements of the invention embodied therein, Figure 2 shows the circuit breaker of Figure 1 in the open position, Figure 3 is a top view of Figures 1 and 2, Figures 4 and 5 illustrate a modification of the circuit breaker of the type shown by the previous figures in closed and open position, respectively, Figures 6 and 7 illustrate modifications of the circuit breaker according to Figures 4 and 5, Figures 8 to 12 illustrate diagrammatically further modifications of an electrolytic circuit breaker constructed according to the invention, Figure 13 is a cross-section of a practical construction for a complete circuit breaker designed in accordance with the invention, Figure 14 is a side view of the circuit breaker shown in Figure 13, Figure 15 is another side view of Figure 13 with the cover removed, and Figure 16 is a diagram showing still a further modification of the invention.

Similar reference numerals identify similar parts through the different views of the drawings.

The following are the main requirements which have been found essential to effect sparkless switching of heavy electrical currents by means of an electrolytic switch or circuit breaker; first, the employment of a highly conducting electrolyte; second, the avoidance of metallic contacts within the electrolyte; third, the prevention of the formation of a cathode spot and attendant generation of metal vapors at the interrupting point; fourth, the maintenance of a definite specific current density at the electrodes; fifth, the suppression of creeping currents. By creeping currents there are understood equalizing currents set up along the walls of an insulating body if both surfaces of the body are covered by moisture and subjected to different electric potentials. These creeping currents are the source of considerable trouble due to heating and other defects well known.

In order to comply with the aforementioned requirements, it is essential in accordance with the improvements of the invention that the cathode or the momentary cathode (in case of alternating current) at the instant of interruption of the current remains more or less or preferably entirely covered by the electrolyte, and that furthermore the electrolyte body is separated into different volumes. Moreover, the insulating parts interrupting or separating the electrolyte should be disconnected from the tension of the associate electric circuit or network after the current has been interrupted.

It has further been found that a formation of the electrode surfaces will enable the employment of a higher current density. The electrolyte used is preferably a solution permitting the employment of an insulating protective layer such as oil or the like floating upon the surface of the electrolyte. A preferred electrolyte of this type is a solution of potassium carbonate.

The current carrying capacity or power of an electrolytic circuit breaker of the above type depends essentially upon the heating during the passage of the current. To comply with this requirement, the current is passed through a metallic shunt circuit until close to the instant of interruption by the electrolyte path. Since the opening of the shunt circuit also has to be effected without sparking or arcing, it is necessary that the potential between the shunt contacts during the current passage therethrough and the electrolyte, i. e., during the closed position of the circuit breaker, should never exceed about 50 to 20 volts or preferably remain below about 10 volts. This requirement determines the permissible current intensity for the circuit breaker for a given surface of and distance between the electrodes.

Referring to the drawings, Figures 1 to 3, there is shown a circuit breaker of simple construction with the improvements of the invention embodied therein. In this figure, numeral 10 represents a metallic container which simultaneously serves as one of the electrodes of the circuit breaker, numeral 11 represents the other electrode, in the example shown having a cylindrical shape and arranged within the container 10, 12 is the electrolyte which may be a solution of potassium carbonate, 13 is a cup shaped separator of insulating material such as porcelain, enameled metal sheet or the like having a turned over upper edge 14 to provide an air pocket for the prevention of creeping currents, and 15 is an insulating layer of oil or the like floating upon the surface of the electrolyte 12. There is further shown at 16 an actuating member or rod having its lower end secured to the cup 13 for lifting the latter out of the electrolyte. Item 17 represents conducting arms or brackets secured to the rod 16 and metallically short circuiting the electrodes 10 and 11 in the closed position as shown so as to form a metallic shunt path around the electrolyte circuit path between the electrodes 10 and 11 in the manner as pointed out hereinabove. The rod 16 is held in the position illustrated by a suitable locking or tripping device (not shown) against the action of a compressed coil spring 18 in a manner as is customary with circuit breaker constructions. If, for the purpose of opening the circuit breaker the rod 16 is released by a suitable tripping device (not shown) the spring 18 will push the rod in an upward direction, thereby at first disconnecting the short circuiting arms 17 and interrupting the metallic shunt circuit between the electrodes 10 and 11. Thereupon the cup 13 will emerge from the electrolyte 12 or oil layer 15, respectively, thus interrupting the current through the electrolyte path and carrying the electrode 11 with it in an upward direction such as shown in Figure 2.

As a result, the electrolyte level in the container 10 descends to a lower position in such a manner that the cup 13 together with the enclosed electrode 11 is suspended above the electrolyte. At the end of the movement the extensions or nipples 19 of the short circuit arms or brackets 17 engage the switch arms 20 connected to the input terminals 21 and 22 whereby the circuit breaker is disconnected from the tension or potential of the associate electric circuit or network. All these operations are formed by the movement of a single element in such a manner that the opening can be performed rapidly due to the fact that no arc has to be quenched as in the case of the known circuit breakers such as those of the magnetic type at present employed in the art. In the example shown, the movement of the rod 16 is guided by a hollow hub carried by insulating supporting arms 24 secured to the casing or electrode 10 in a suitable manner.

The circuit breaker may be closed by downward movement of the rod 16, whereby, in a reversed manner, after applying the tension first the electrolyte path and thereafter the metallic shunt path are closed. In order to limit the downward movement of the electrode 11 to a position shown in Figure 1, a suitable stop member (not shown) may be provided.

Figure 5:
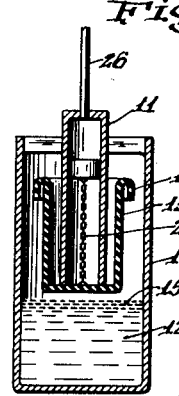

Referring to Figures 4 and 5, there is shown a modification of a circuit breaker of the aforedescribed type. In this embodiment the spring 18 is replaced by a piston 25 arranged to move within the electrode 11 and operated by over- or under-pressure applied through an inlet tube 26 in a manner well understood. The piston 25 is connected to the insulating cup 13 through a chain 27 or the like. In this arrangement the electrode 11 is fixed relative to the container 10 such as by securing the same to the insulating supporting arms 24. The interruption of the current is effected at the instant when the upper edge of the cup 13 emerges from the electrolyte, while the disconnection from the tension takes place after the bottom of cup 13 leaves the electrolyte level as shown in Figure 5. The metallic shunt path and means for effecting the complete disconnection from the circuit may be substantially the same as shown in Figures 1 to 3. Instead of using compressed or rarified air for operating the piston 25, the latter may be actuated directly by a rod similar to the arrangement according to Figures 1 to 3 as is understood.

Referring to Figures 6 and 7, there is shown a further improvement consisting in the provision of an insulating hood 28 above the electrolyte enclosing the insulating cup 13 in the open position of the circuit breaker. Both the hood 28 and the container 10 are provided with ventilating outlets 29 and 29' to enable gases developed during the operation to escape to the outside. In the latter case, the hood 28 may have a cover 30 extending to the edge of the container 10 as shown in Figure 7. In order to cause an automatic replenishing of the electrolyte there is further shown in Figure 7 a closed bottle shaped container 31 which may be filled with water or any other solvent and having a lower outlet pipe or nozzle 31'. The container 31 will empty itself to an extent corresponding to the degree of descent of the electrolyte level below the lower edge of the nozzle 31', thereby automatically maintaining the electrolyte level at a fixed height.

Figure 8:
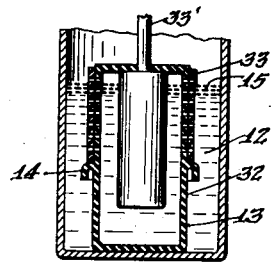

Referring to Figure 8, there is shown a construction wherein the insulating cup 13 with its down-turned edge 14 has an upward perforated extension 32 surrounded by a closely fitting cylindrical cover or hood 33 provided with corresponding perforations to the member 32. Thus by turning the hood or cylinder 33 mounted upon a shaft 33', the perforations in both members may be either closed or brought into register with each other, thereby either interrupting or establishing the electrolyte path between the electrodes 10 and 11. An advantage of this construction is the fact that a slight mutual displacement of the members 32 and 33 will suffice to interrupt the electrolyte path for interrupting the current flow between the electrodes.

Figure 9:
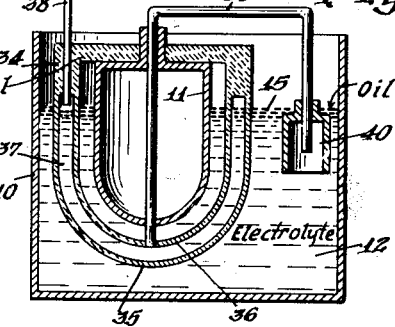

Referring to Figure 9, there is illustrated a further modification of the invention wherein the central electrode 11 is surrounded by a hollow member 34 having walls 35 and 36 and consisting of a suitable porous material adapted to conduct the electric current when in contact with the electrolyte but capable of retaining and preventing passage of the electrolyte. Thus, a current flow will take place if the hollow space 37 between the walls 35 and 36 is filled with electrolyte, while the current flow is interrupted if the electrolyte within the space 37 is forced into the outer container 10 through a connecting tube or pipe 39 by compressed air or the like applied through an inlet 38. In order to avoid creeping currents the discharge opening of the tube 39 within the electrolyte 12 of the main container is surrounded by a shell 40 and the lower end in the inlet tube 38 is arranged slightly above the electrolyte level.

According to the modification of Figure 10, the electrodes 10 and 11 are enclosed by porous walls or diaphragms 41, 42 of a suitable material capable of conducting the electric current but impermeable to the electrolyte. The electrolyte 12 is arranged between the walls 41, 42 and may be removed through a tube 38 by suction in a manner similar as described hereinabove. The electrolyte 43 is retained between the porous walls 41, 42 and the electrodes 10 and 11, respectively, even after the electrolyte 12 has been removed from the space enclosed by the walls 41, 42.

Figure 11 shows an electrode 10 with a forming layer 44 thereon. This formation automatically takes place after a prolonged use of the circuit breaker, but if desired the electrodes may be preformed as is understood. This formation consists in the production of a thin resistive layer by electrolytic deposit which while not materially increasing the voltage drop or losses through the circuit breaker has the advantage of preventing generation of hydrogen ions at the electrode surface liable of causing a voltage breakdown.

Referring to Figure 12, there is shown a further modification of a circuit breaker of the type according to Figures 9 and 10 comprising an insulating container 46 with an outer annular space and an inner cylindrical space. The electrodes 47 and 48 are of cylindrical shape and closely secured to the inner walls of the annular container. There are further provided a pair of cylindrical porous members 49 and 50 intermediate between the electrodes 47 and 48 and having characteristics as pointed out above. Numeral 51 represents a cylindrical displacement body occupying the inner cylindrical space of the container 46 in the closed position of the circuit breaker. If the member 51 is released by a suitable tripping device it will be forced in an upward direction by the action of a previously compressed spring 52, thereby allowing the electrolyte to descend from a level a to a level b and causing an interruption of the current path between the electrodes 47 and 48 as is readily understood from the above. The metallic shunt path may be formed in a manner similar to the previous figures, such as by spring contacts 53' carried by short circuiting arm 53 secured to the member 51. Similarly, means may be provided to disconnect the circuit breaker from the tension of the associate electric circuit in substantially the same manner as described in connection with the previous figures.

In Figure 13 there is shown a practical construction of an electrolytic circuit breaker of the type according to the invention. In this Figure numeral 55 represents a flanged insulating cylinder having mounted at its opposite ends the electrodes 56 and 57 in the form of metal discs preferably consisting of iron or the like and held by means of a cover 58, a first angular spacing-insulating ring 59 and a second spacing ring 60. Item 61 represents a rotatable insulating disc contiguous to the disc 59, and 62 is a further stationary disc adjacent to disc 61. The three discs 59, 61, 62 are provided with openings or recesses 63 (see Figure 15) being either in register to provide an electrolyte path between the two chambers into which the space enclosed by the electrodes 56 and 57 is divided by the disc 61, in the closed position of the circuit breaker or closed when the disc 61 is rotated through a definite angle in the open position of the circuit breaker, thereby intercepting the electrolyte path and interrupting the current flow therethrough. The disc 62 has an axial extension or stud 62' engaging a hole in the electrode 57 thereby enabling axial movement of the disc 62 but preventing it from rotating. A shaft 64 having its end secured to the disc 61 serves to rotate the latter to close or intercept the electrolyte path between the two electrolyte chambers in the manner described. The disc 62 has a hub-like extension fitting over the shaft 64 on the one side and arranged within a cylindrical extension of the electrode 57. Item 65 is a sealing gasket of rubber or the like pressed against the end of the hub of the disc 62 by a coil spring compressed by means of a cap 66, screwed over the cylindrical extension of the electrode 57. The filling of the two electrolyte chambers is effected during the open position of the disc 61 through an inlet tube 67. In order to observe the electrolyte level, gauges 68 are provided which also act as vents for enabling the escape of gases formed in the electrolyte chambers. The current is applied through leads or cables 70 and 71. Cable 70 is connected to a contact 72 insulatingly mounted upon a stud or bolt 73 and furthermore to the disc or electrode 57 through an extension 74. The cable 71 is connected through a switch 75 to contact 76 insulatingly mounted upon stud or extension 77 through a switch 87. The contact 76 is further connected through a cable 78 to the other disc or electrode 56. The electrodes 72 and 76 are bridged by a short circuiting arm 79 forming a metallic shunt path around the electrolyte path in the manner described hereinbefore. The short circuit arm 79 is mounted upon the shaft 64, the rotation of which is effected by a spring 80 having one end thereof engaging the cam 81 of the short circuiting arm. By releasing the pin 82 or the like the spring 80 will move the short circuiting arm 79 in a counter-clockwise direction thereby opening the parallel contacts or shunt circuit between 72 and 76 and rotating the disc 61 through an angle of about 60° until it reaches the stop 84. In this manner, the electrolyte path will be intercepted as described, whereupon in the final position of the switch arm 79 the latter engages a gliding pin 85 moving within a guide 86, thereby effecting the opening of the switch 75 and interrupting the connection to the cable 71. In this manner, after the interruption of the current, the circuit breaker is disconnected from the tension of the associate electric circuit or network. In order to restore the closed condition of the circuit breaker, the shaft 64 may be rotated in an opposite direction by a crank device, whereby the above operations take place in reversed manner.

Referring to Figure 16 there is shown a diagram for another modification of the invention. The latter comprises a rotatable drum separated into two compartments by a separating wall or disc with two semi-circular sections 91 and 92, one of which consists of porous material adapted to pass the electric current but impermeable to the electrolyte while the other is solid and passes neither the electric current nor the electrolyte. The drum is surrounded by an outer insulating casing 93 having a cover 94. The opposite halves of the drum are connected to shafts 95 and 96 mounted in suitable bearings and serving as terminals for applying the electric current. As is seen in one position of the drum, a current path is established through the porous portion of the separating disc, while in the other position the current path is interrupted.

It will be evident from the above that while the invention has been described with specific reference to the embodiments shown in the drawings and disclosed for illustration numerous variations and modifications may be resorted to in accordance with the underlying general principle and concept of the invention and coming within the broader scope and spirit thereof as defined in the appended claims.

The specification and drawings are accordingly intended to be regarded in an illustrative rather than a limiting sense.

I claim:

1. An interrupter for heavy electric currents comprising a pair of electrodes spaced from each other, a highly conducting electrolyte disposed between said electrodes, a pair of perforated insulating separating members arranged contiguous to one another and dividing the space occupied by said electrolyte into two separate chambers, one of said members being movable relatively to the other member to bring the perforations of said members into and out of registry, thereby to close and intercept, respectively, the electrolyte path between said electrodes, metallic short circuiting means between said electrodes to provide a direct shunt circuit across the electrolyte path, and a common actuating member for said movable separating member and said short circuiting means adapted to first open said shunt circuit, and thereafter intercepting the electrolyte path by a single operating movement.

2. An interrupter for heavy electric currents comprising a pair of electrodes spaced from each other, a highly conducting electrolyte disposed between said electrodes, a pair of perforated insulating separators contiguous to one another and dividing the space occupied by said electrolyte into two distinct chambers, one of said members being movable relatively to the other member to bring the perforations of said members into and out of registry, thereby to close and intercept the electrolyte path between said electrodes, metallic short circuiting means connecting said electrodes to provide a direct shunt circuit across the electrolyte path, switching means connecting said electrodes to a supply line, and a common actuating member for said movable separating member, said short circuiting means and said switching means and adapted to first open said shunt circuit, thereafter to intercept the electrolyte path, and to finally disconnect said switching means.

3. An interrupter for heavy electric currents comprising a pair of electrodes spaced from each other, an annular insulating member connecting said electrodes to form a closed cylindrical vessel, a highly conducting electrolyte within said vessel, a plurality of perforated insulating discs arranged contiguous to one another and dividing said vessel into two equal chambers, at least one of said discs being rotatable to bring the perforations thereof into and out of registry with the perforations of the remaining discs, thereby to close and intercept, respectively, the electrolyte path between said electrodes, metallic short circuiting means connecting said electrodes to provide a direct shunt circuit across the electrolyte path, and a common actuating member cooperatively associated with said rotatable disc and said short circuiting means and adapted to first open said shunt circuit, and thereafter intercept the electrolyte path between said electrodes by a single operating movement.

4. An interrupter for heavy electric currents comprising a pair of electrodes spaced from each other, an insulating member connecting said electrodes to form a closed vessel, a highly conducting electrolyte disposed within said vessel, a plurality of perforated insulating discs arranged contiguous to one another and dividing said vessel into two equal chambers, at least one of said discs being rotatable to bring its perforations into and out of registry with the perforations of the remaining discs, thereby to close and intercept, respectively, the electroylte path between said electrodes, a metallic short circuit element connecting said electrodes to provide a direct shunt circuit across the electrolyte path, further switching means connecting said electrodes to a supply line, and a common actuating member cooperatively associated with said rotatable disc, said short circuit element and said switching means adapted to first open said shunt circuit, thereafter to intercept the electrolyte path, and to finally disconnect said switching means.

5. An interrupter for heavy electric currents comprising a pair of electrodes spaced from each other, a highly conducting electrolyte disposed between said electrodes, a pair of separating walls between said electrodes consisting of a porous material capable of conducting an electric current when in contact with but impermeable to the electrolyte, and means for removing the electrolyte between said separating walls to interrupt the current flow between said electrodes.

6. An interrupter as claimed in claim 5 wherein the electrolyte is removed by compressed air.

7. An interrupter for heavy electric currents comprising a pair of electrodes spaced from each other, a highly conducting electrolyte disposed between said electrodes, a hollow body consisting of porous material capable of conducting the electric current when in contact with the electrolyte, said body being arranged between said electrodes, the space within said body being normally filled with electrolyte, and means for removing the electrolyte from within said space to interrupt the current flow between said electrodes.

8. In an interrupter for electric currents as claimed in claim 7 wherein the electrolyte within said spaces is removed by the aid of compressed air.

9. An interrupter for heavy electric currents comprising a pair of electrodes spaced from each other, a highly conducting electrolyte disposed between said electrodes, a movable separating member having one portion thereof consisting of porous material capable of passing the electric current when in contact with the electrolyte and having its remaining portion consisting of material impervious to both current and electrolyte, thereby to close and intercept the electrolyte between said electrodes in either of two limit positions of said separating member.

10. An interrupter for heavy electric currents comprising a pair of electrodes spaced from each other, a pair of spaced walls between said electrodes of porous material capable of conducting the electric current when in contact with an electrolyte, each of said walls forming a receptacle with the adjacent electrode, a highly conducting electrolyte disposed within said receptacles and filling the space between said walls, and means for introducing into and removing electrolyte from the space between said walls to establish and interrupt respectively, the current flow between said electrodes.

PAUL WANGEMANN.